US012640918B2

(12) United States Patent
Dhar et al.

(10) Patent No.: US 12,640,918 B2
(45) Date of Patent: May 26, 2026

(54) DECISION ENGINE CONSISTENCY VERIFICATION SYSTEM

(71) Applicant: Bank of America Corporation, Charlotte, NC (US)

(72) Inventors: Partha Sarathi Dhar, Chester Springs, PA (US); Ravi Kiran Hukmani, Hyderabad (IN); Naresh Kumar Chitipolu, Middletown, DE (US); Kanaka Subramaniam Kunjithapatham, Newark, DE (US); Daniel Lee Wadsworth, Washington, DC (US); Adam Jones, Landenberg, PA (US); Manisha S. More, Waxhaw, NC (US); Uma Sheela, Plano, TX (US); Manivannan Perumalswami, Frisco, TX (US); Vasu Puli, Secunderabad (IN); Swarn Deep, Dwarka (IN); Kamal Joshi, Ghaziabad (IN)

(73) Assignee: Bank of America Corporation, Charlotte, NC (US)

( * ) Notice: Subject to any disclaimer, the term of this patent is extended or adjusted under 35 U.S.C. 154(b) by 47 days.

(21) Appl. No.: 18/660,989

(22) Filed: May 10, 2024

(65) Prior Publication Data

US 2025/0350450 A1 Nov. 13, 2025

(51) Int. Cl.
H04L 9/08 (2006.01)

(52) U.S. Cl.
CPC .......... H04L 9/0855 (2013.01); H04L 9/0838 (2013.01)

(58) Field of Classification Search
CPC ... H04L 9/0852; H04L 9/0858; H04L 9/0855; H04L 63/061; H04L 9/083; H04L 9/0822; H04L 9/3226; H04L 9/0891; H04L 9/14; H04L 9/0827; H04L 2209/24; H04L 9/08; H04L 9/0819; H04L 9/088; H04L 9/0844; H04L 9/0618; H04W 12/041; H04W 12/0431; H04W 12/0433; H04W 12/04; H04W 12/61; H04W 12/63; H04W 12/71;
(Continued)

(56) References Cited

U.S. PATENT DOCUMENTS

| | | | | | |
|---|---|---|---|---|---|
| 5,764,765 | A | * | 6/1998 | Phoenix | ............... H04L 9/0858 380/256 |
| 6,748,083 | B2 | * | 6/2004 | Hughes | ................ H04L 9/0858 380/278 |

(Continued)

*Primary Examiner* — Sharif E Ullah

(74) *Attorney, Agent, or Firm* — Banner & Witcoff, Ltd.

(57) ABSTRACT

Various aspects of the disclosure relate to verification of data sets used for real-time processes and/or batch processes. A computing platform negotiates, by a first quantum node, a shared key group with at least a second quantum node and calculates an exclusive or (XOR) value of a pair of the first quantum node and the second quantum node. The first quantum service node performs a shared key grouping with the second quantum node and then selects a quantum key relay link between a real-time node and a batch source node. The computing platform selects a corresponding state of all virtual quantum nodes associated with the quantum key relay link and encapsulates a virtual quantum link state between any two quantum service nodes in the quantum network into a database decision engine data file.

20 Claims, 6 Drawing Sheets

(58) Field of Classification Search

CPC .......... G06F 21/31; G06F 21/44; G06F 7/588;
G06F 21/72; G06F 21/86
USPC ........ 380/278, 255, 264, 276; 726/2, 21, 36;
713/150, 163, 181

See application file for complete search history.

(56) References Cited

U.S. PATENT DOCUMENTS

| | | | | |
|---|---|---|---|---|
| 7,437,081 | B2 * | 10/2008 | Mitchell | H04B 10/70 |
| | | | | 398/154 |
| 8,347,182 | B2 * | 1/2013 | Brown | H03M 13/098 |
| | | | | 714/764 |
| 8,761,401 | B2 * | 6/2014 | Sprunk | H04L 9/0844 |
| | | | | 380/278 |
| 8,782,774 | B1 * | 7/2014 | Pahl | H04L 9/0841 |
| | | | | 726/4 |
| 8,855,316 | B2 * | 10/2014 | Wiseman | H04L 9/0855 |
| | | | | 380/278 |
| 8,978,034 | B1 * | 3/2015 | Goodson | G06F 16/24544 |
| | | | | 718/101 |
| 9,628,268 | B2 * | 4/2017 | Kiang | G06F 21/6218 |
| 9,960,465 | B2 * | 5/2018 | Dudley | H01M 50/204 |
| 10,057,058 | B2 * | 8/2018 | Murakami | H04L 9/0858 |
| 10,419,465 | B2 * | 9/2019 | Muddu | G06F 16/285 |
| 10,691,671 | B2 * | 6/2020 | George | H04L 65/762 |
| 11,316,677 | B2 * | 4/2022 | Ko | H04L 9/12 |
| 11,683,165 | B2 * | 6/2023 | Rahman | H04L 9/0827 |
| | | | | 380/278 |
| 11,856,094 | B2 * | 12/2023 | Durak | H04B 10/1129 |
| 2005/0138352 | A1 * | 6/2005 | Gauvreau | H04L 9/3247 |
| | | | | 713/153 |
| 2007/0065154 | A1 * | 3/2007 | Luo | H04L 9/0852 |
| | | | | 398/141 |
| 2007/0076884 | A1 * | 4/2007 | Wellbrock | H04L 9/0855 |
| | | | | 380/263 |
| 2007/0195774 | A1 * | 8/2007 | Sherman | H04L 69/16 |
| | | | | 370/392 |
| 2011/0206204 | A1 * | 8/2011 | Sychev | H04J 14/06 |
| | | | | 380/256 |
| 2011/0213979 | A1 * | 9/2011 | Wiseman | H04L 9/0844 |
| | | | | 713/171 |
| 2013/0198093 | A1 * | 8/2013 | Taylor, III | G06F 16/9535 |
| | | | | 705/311 |
| 2014/0010234 | A1 * | 1/2014 | Patel | H04L 45/74 |
| | | | | 370/392 |
| 2014/0068765 | A1 * | 3/2014 | Choi | H04L 63/1416 |
| | | | | 726/23 |
| 2014/0133652 | A1 * | 5/2014 | Oshida | H04L 9/0897 |
| | | | | 380/255 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2017/0237559 | A1 * | 8/2017 | Yuan | H04L 9/0852 |
| | | | | 380/283 |
| 2018/0176091 | A1 * | 6/2018 | Yoon | H04L 5/1446 |
| 2019/0036821 | A1 * | 1/2019 | Levy | G06F 12/0868 |
| 2019/0149327 | A1 * | 5/2019 | Yuan | H04L 9/0852 |
| | | | | 380/255 |
| 2019/0349392 | A1 * | 11/2019 | Wetterwald | H04L 43/0852 |
| 2020/0084222 | A1 * | 3/2020 | William | H04L 63/12 |

* cited by examiner

100

104

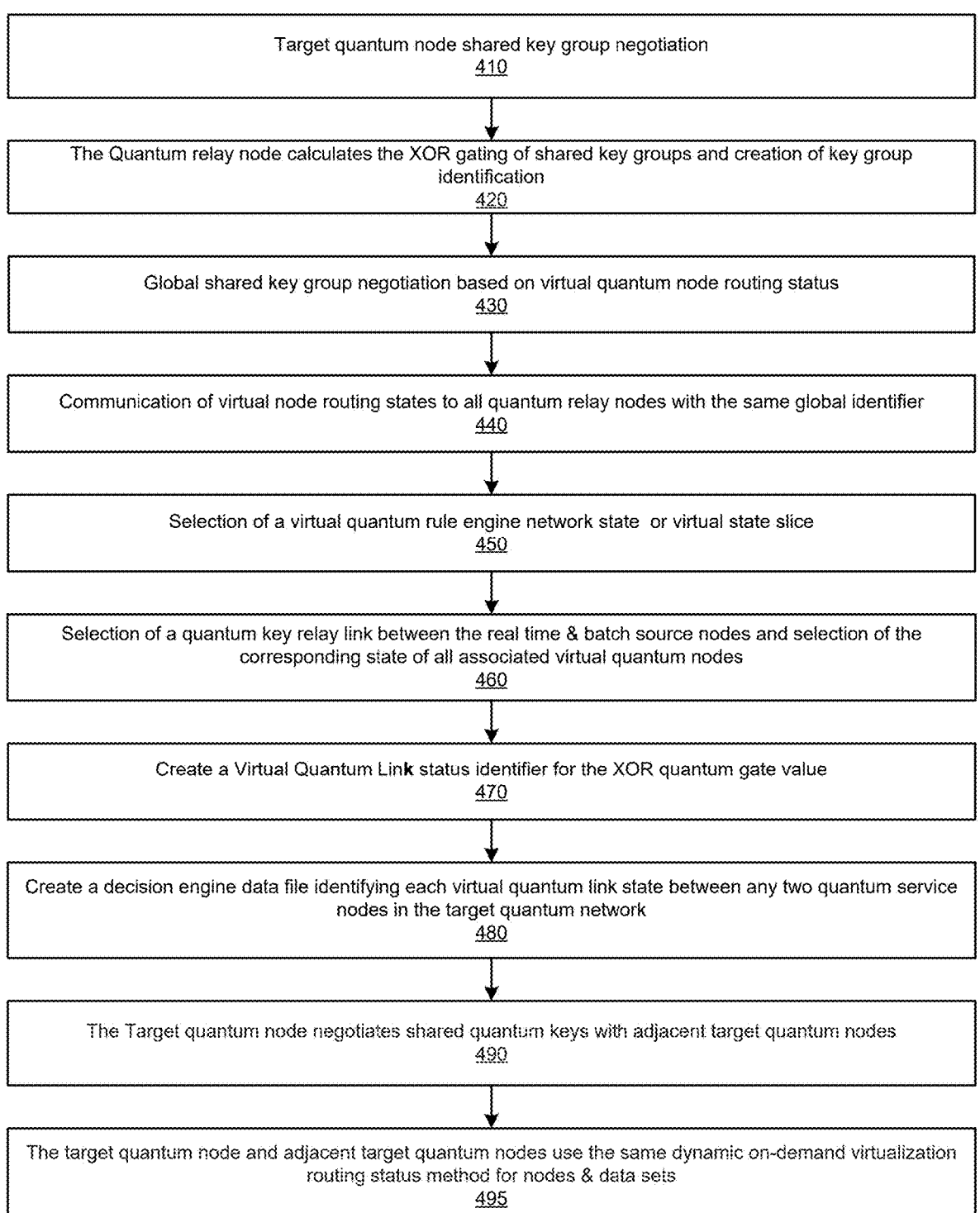

400

Target quantum node shared key group negotiation
410

The Quantum relay node calculates the XOR gating of shared key groups and creation of key group identification
420

Global shared key group negotiation based on virtual quantum node routing status
430

Communication of virtual node routing states to all quantum relay nodes with the same global identifier
440

Selection of a virtual quantum rule engine network state  or virtual state slice
450

Selection of a quantum key relay link between the real time & batch source nodes and selection of the corresponding state of all associated virtual quantum nodes
460

Create a Virtual Quantum Link status identifier for the XOR quantum gate value
470

Create a decision engine data file identifying each virtual quantum link state between any two quantum service nodes in the target quantum network
480

The Target quantum node negotiates shared quantum keys with adjacent target quantum nodes
490

The target quantum node and adjacent target quantum nodes use the same dynamic on-demand virtualization routing status method for nodes & data sets
495

FIG. 4

DECISION ENGINE CONSISTENCY VERIFICATION SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization, such as a financial institution, to manage its computer systems efficiently, effectively, securely, and uniformly, and particularly manage how internal computer systems exchange information with external computer systems in providing and/or supporting different products and services offered by the organization.

Current testing environments are often dependent upon manually submitted applications, which limits the application volume that can be used for testing. Often, with changes to the application, strategy changes must be performed to ensure proper and secure operation. To test strategy changes against large or small volume of data, current systems utilize a rule engine technology-focused strategies dataset, where each technology specific applications utilize their own infrastructure and/or service events. Managing each technology code base within a large computing environment under a single data repository is challenging because the code base continually increases. Because of the constant changes from multiple systems, the code base is often subject to bugs and/or unintended operations, such as broken non-impacted technological functionality when multiple coding teams (e.g., agile development teams) modify, use, and/or re-use the same code stored within a single data repository. Such systems may be used to support multiple applications, that may utilize a versioning system, with one version as a leading version that requires testing using dynamic events for all combinations of data sets, where each data set and/or application utilizes different rule sets. However, today's systems are not intelligent enough to automatically adjust.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like). Aspects of the disclosure relate to computer hardware and software. In particular, one or more aspects of the disclosure generally relate to computer hardware and software for deploying and implementing consistency testing computing platforms to support automated consistency testing of applications.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes using real-time quantum services dynamically processing rules to identify targets states of a target recipient.

The decision engine consistency verification system provides a technological solution that ensures consistency when evaluating rule sets for one or more applications and/or services (e.g., automated underwriting services) purposes across multiple releases, such as for one active baseline, one or more for testing, and/or to provide a comparison of the one or more test releases against the baseline. Additionally, as mentioned above, multiple products and/or services may leverage a common rule or rule set, where data sets may be flexible (e.g., from one entry, thousands (e.g., 20,000) entries, and the like). The decision engine consistency verification system performs a process that can be executed repeatedly with minimum technology changes between executions. Further, the process is rules engine agnostic such that the decision engine consistency verification system may support an existing rules engine with provisions for supporting one or more new rules engines that could be added later. The decision engine consistency verification system is also product agnostic, with capabilities to support one or more existing products and/or services and can be extended to support other future products that uses one or more of the supported rule engines. The decision engine consistency verification system provides a secure and compliant process mechanism that performs information security policies and best practices. The decision engine consistency verification system, when technology enabled systems are changed due to strategy and/or model iterations, the decision engine consistency verification system has the ability to test changes using production data to cover scenarios that are not achievable in lower environments (e.g., development, unit test, and the like). The decision engine consistency verification system is capable of testing changes involving large volumes of data (e.g., about 20,000) within a single test, as well as testing changes with a diverse test bed of data that is inherent to production data sets. The decision engine consistency verification system may select a specific set of test data based on application identifiers (e.g., a unique system identifier.) The decision engine consistency verification system identifies a difference between system errors and strategy criteria errors to allow the decision engine consistency verification system to provide nuanced results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 shows an illustrative process for use of quantum service responders with a virtual network to perform decisioning consistency validation in accordance with one or more aspects described herein.

DETAILED DESCRIPTION

Figure 1A:
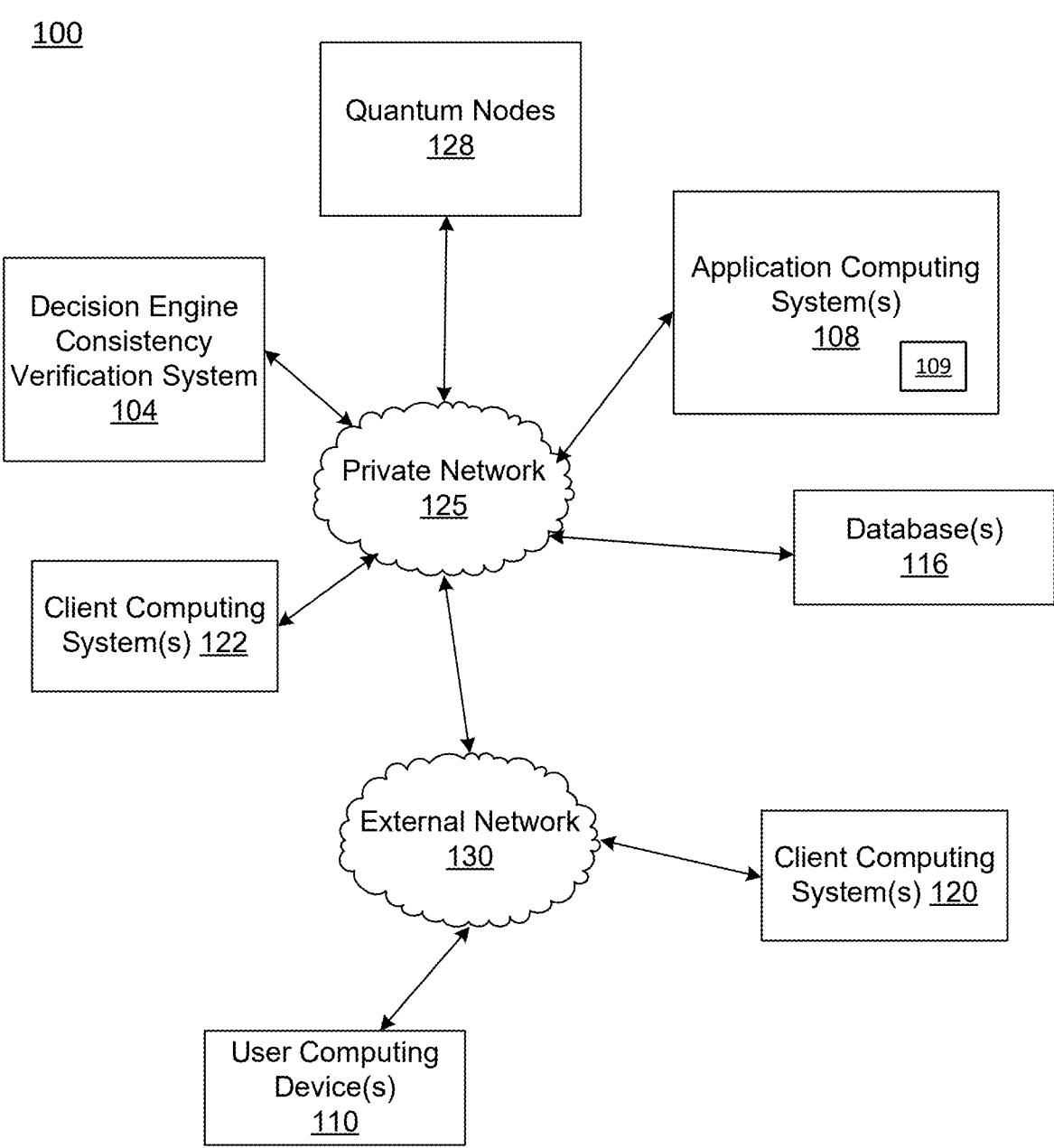
FIG. 1A shows an illustrative computing environment for real-time and batch validation decisioning, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

The decision engine consistency verification system utilizes quantum key negotiation as a step when generating a global identifier that is used to create a virtual (e.g., a responder) quantum link. The created virtual responder quantum link is used to generate sub-network states between real-time and batch quantum nodes that may be used to relay processing information into a target database. In doing so, the decision engine consistency verification system improves the turn-around time for feedback, where validation is faster using virtual quantum link than the traditional methods shown illustrated in FIG. 2. The decision engine consistency verification system includes a rule engine data network that incorporates dynamic routing status that is more efficient and less time consuming. The decision engine consistency verification system receives needed dynamic data via an on-demand virtualization of nodes and data sets. Further, the decision engine consistency verification system reduces the number of deployments on computing infrastructure necessary to perform the operations, which, not only results in cost savings for equipment, configuration time, and support time, but also simplifies the release management. As such, the decision engine consistency verification system's use of unified deployment infrastructure utilized across technology bases results in reduced total cost of application validation and management. The decision engine consistency verification system minimizes efforts of performing data vulnerability remediations and can be applicable to data verification operations for any applications, not limited to any single application. In some cases, the decision engine consistency verification system may be enabled using classical computing systems, artificial intelligence-enabled computing systems, or a combination.

FIG. 1A shows an illustrative computing environment 100 for data consistency verification operations, in accordance with one or more arrangements. The computing environment 100 may comprise one or more devices (e.g., computer systems, communication devices, and the like). The computing environment 100 may comprise, for example, a decision engine consistency verification system 104, one or more application computing systems 108, a plurality of quantum nodes 128 of a quantum computing systems, one or more client computing systems 122, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise a client computing systems 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.). While FIG. 1A shows the decision engine consistency verification system 104 as being implemented as a separate computing system, portions the decision engine consistency verification system 104 may be incorporated within one or more different computing systems.

The decision engine consistency verification system 104 may comprise one or more computing devices and/or other computer components (e.g., processors, memories, communication interfaces) configured to perform one or more functions as described herein. Further details associated with the architecture of the decision engine consistency verification system 104 are described with reference to FIG. 1B.

The application computing systems 108 and/or the client system 122 may comprise one or more computing devices and/or other computer components (e.g., processors, memories, communication interfaces). In addition, the application computing systems 108 and/or the client system 122 may be configured to host, execute, and/or otherwise provide one or more enterprise applications. In some cases, the application computing systems 108 may host one or more services 109 configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services 109. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing systems 122 and/or the application computing systems 108 may comprise various servers and/or databases that store and/or otherwise maintain account information, such as financial account information including account balances, transaction history, account owner information, and/or other information. In addition, the client computing systems 122 and/or the application computing systems 108 may process and/or otherwise execute transactions on specific accounts based on commands and/or other information received from other computer systems comprising the computing environment 100. In some cases, one or more of the client computing systems 122 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing systems 120 may integrate API calls to request data, initiate functionality, or otherwise communicate with the one or more application computing systems 108, such as via the services 109. For example, the services 109 may be configured to facilitate data communications (e.g., data gathering functions, data writing functions, and the like) between the client computing systems 120 and the one or more application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125. The quantum nodes 128 of the quantum computing system may be enterprise owned and/or provided by a third-party, such as a quantum as a service interface. The quantum computing nodes 128 may be provided by one or more different organizations and may be separate from the enterprise network (e.g. accessible via the external or public network 130) and/or within the enterprise network (e.g., accessible via the private network 125). In some cases, quantum computing nodes 128 may be provided as a service to one or more organizations or business units to facilitate complex computing operations. Such computing environments allow users to build quantum computing programs via a quantum computing associated programming language, either remotely within the quantum computing nodes 128 or remotely within a user's computing environment. Often users may submit their quantum computing code and/or program for running on a quantum computer, such as via a quantum computing as a service interface. In some cases, the user may be given an opportunity to run their quantum computing code and/or program on one or more different quantum computers and/or within a combined classical and quantum computing environment combining classical and quantum computing resources within a hybrid environment. Outputs may be provided to the originator (e.g., the decision engine consistency verification system 104, the originating computing system or device such as a user device 110, a client computing system 120, 122, an application computing system 108, and/or the like).

The database(s) 116 may comprise one or more computer-readable memories storing information that may be used by the decision engine consistency verification system 104. For example, the database(s) 116 may store virtual quantum links, decisioning rules, quantum negotiation rules, and the like. In an arrangement, the database(s) 116 may be used for other purposes as described herein. In some cases, the client computing systems 120 may write data or read data to the database(s) 116 via the services 109.

In one or more arrangements, the decision engine consistency verification system 104, the application computing systems 108, the client computing systems 122, the client computing systems 120 and/or 122, the user devices 110, and/or the other devices/systems in the computing environment 100 may be any type of computing device capable of receiving input via a user interface, and communicating the received input to one or more other computing devices in the computing environment 100. For example, the decision engine consistency verification system 104, the application computing systems 108, the client computing systems 122, the client computing systems 120 and/or 122, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the decision engine consistency verification system 104, the application computing systems 108, the client computing systems 122, the client computing systems 120 and/or 122, the user devices 110, and/or the other devices/systems in the computing environment 100 may, in some instances, be and/or comprise special-purpose computing devices configured to perform specific functions.

Figure 1B:
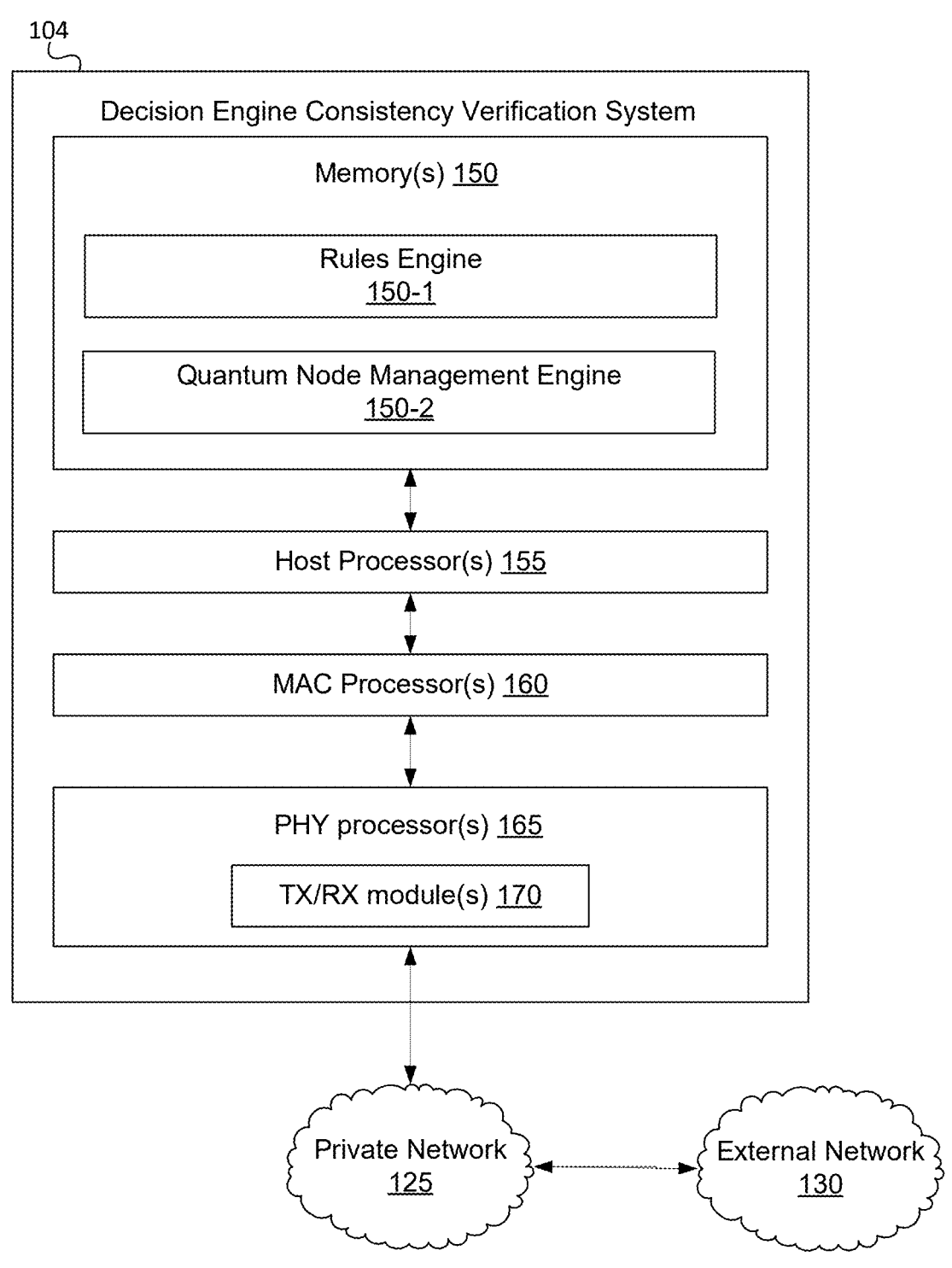
FIG. 1B shows an illustrative computing platform enabled for real-time and batch validation decisioning, in accordance with one or more aspects described herein.

FIG. 1B shows an illustrative the decision engine consistency verification system 104 in accordance with one or more examples described herein. The decision engine consistency verification system 104 may be a stand-alone device and/or may at least be partial integrated with the decision engine consistency verification system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The he decision engine consistency verification system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the he decision engine consistency verification system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the he decision engine consistency verification system 104 may be configured to execute machine readable instructions stored in memory 150. The memory 150 may comprise (i) one or more program modules/engines having instructions that when executed by the one or more processors cause the he decision engine consistency verification system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the he decision engine consistency verification system 104 and/or by different computing devices that may form and/or otherwise make up the he decision engine consistency verification system 104. For example, the memory 150 may have, store, and/or comprise a rules engine 150-1, an quantum node management engine 150-2, and/or the like. The rules engine 150-1 may have instructions that direct and/or cause the he decision engine consistency verification system 104 to perform one or more operations associated with storing and processing quantum node negotiation rules along with dynamic network control rules, and the like. The quantum node management engine 150-2 may have instructions that may cause the he decision engine consistency verification system 104 to perform tests of data repositories to ensure data consistency for both real-time applications and batch file processes.

While FIG. 1A illustrates the decision engine consistency verification system 104 and/or the application computing systems 108, as being separate elements connected in the private network 125, in one or more other arrangements, functions of one or more of the above may be integrated in a single device/network of devices. For example, elements in the decision engine consistency verification system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
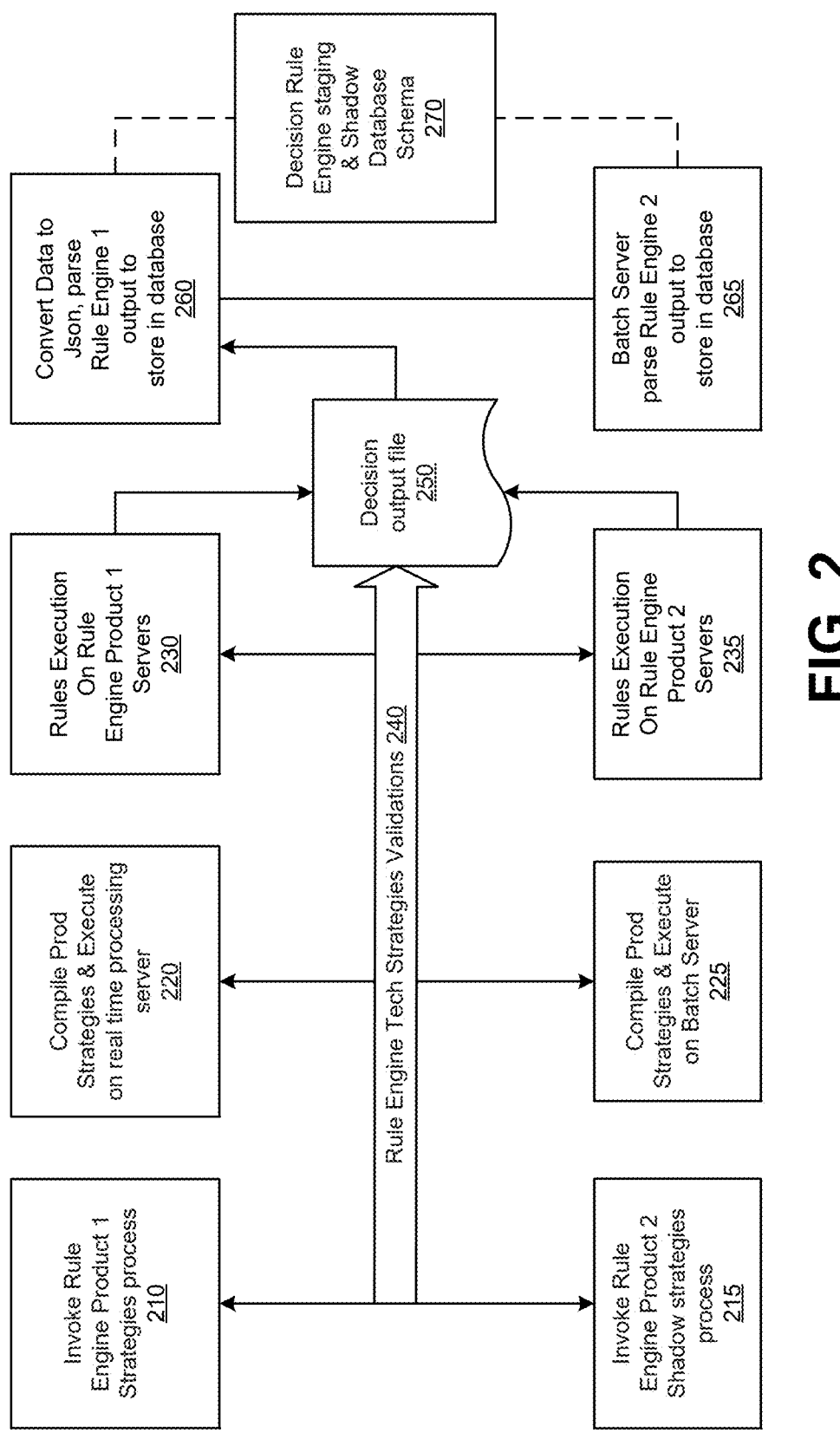
FIG. 2 shows an illustrative block diagram representation of current decisioning processes in accordance with one or more aspects described herein.

FIG. 2 shows an illustrative block diagram representation of current decisioning processes in accordance with one or more aspects described herein. FIG. 2 shows an illustrative example of current processes for performing data consistency checks of databases and/or other data storage repositories used for testing and/or other operations of processes and/or services, both in real-time and batch processing. As can be seen, parallel processing paths are used for each process, where a first product that uses the data comprises a real-time process (e.g., product 1) and a second product using the data comprises a batch process (e.g., product 2). At 210, a data consistency check tool invokes a first rule for product 1 to identify a process strategy, where the data consistency check tool may invoke a second process (e.g., a shadow strategy process) for another product (e.g., product 2) at 215. At 220, the data consistency check tool compiles production strategies and executes them on a real-time processing server, while at 225, the data consistency check tool separately compiles production strategies and executes them on a batch server at 225. At 230, the data consistency check tool initiates execution of first rules via a rule engine for the product 1 servers for real-time process and, at 235, initiates execution of second rules via the rule engine for the product 2 servers for batch processing. Throughout the previous procedure, the rule engine processes strategy validations for all rule sets at 240.

As can be seen, the all processes for both the real-time and the batch processing operations execute separately and are analyzed separately by the data consistency check tool, thus leading to increases computational costs and extended processing times. Once the rules execution completes at 230 and 235 for the real-time processes and the batch processes, the results may be stored in a decision output file 250. The decision output file 250 may be used to convert data to a desired format such as JavaScript object notation (JSON) that is language independent to allow a rule engine to parse the rule engine output for the real-time process at 260 and separately for the batch process at 265, where the results are then stored in a database utilizing a decision rule engine staging and shadow database schema 270. Because each product and/or process type are parsed separately, the database may store excess and/or doubled data, and where the schema may be overly complex.

Figure 3:
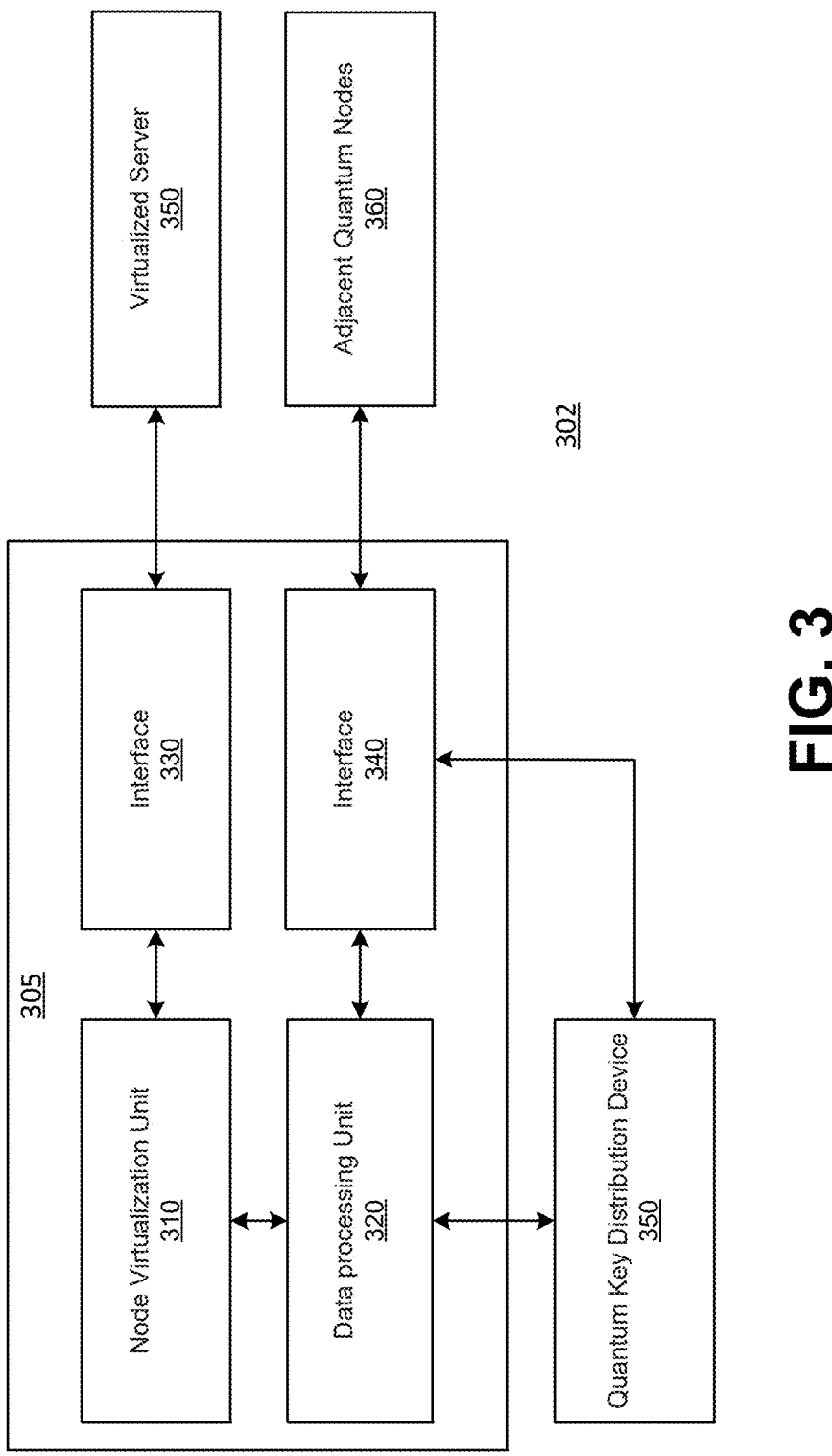
FIG. 3 shows an illustrative block diagram representation illustrating a quantum service nodes with a virtual network, in accordance with one or more aspects described herein.

FIG. 3 shows an illustrative block diagram representation illustrating a quantum service nodes with a virtual network, in accordance with one or more aspects described herein. The decision engine consistency verification system 300 may include a node virtualization unit 310, a data processing unit 320, and/or a quantum key distribution device 350. The node virtualization unit 310 may interface with a virtualized server 370 via a first interface 330. The data processing unit 320 and/or the quantum key distribution device 350 may communicate with one or more adjacent quantum nodes 360 via a second interface 340. The decision engine consistency verification system 300 may be implemented in a quantum computing environment 302, a classical computing environment 305 or a combination of quantum computing components and classical computing components.

FIG. 4 shows an illustrative process for use of quantum service responders with a virtual network to perform decisioning consistency validation in accordance with one or more aspects described herein. At 410, Each target quantum node 360 in the target quantum network 302 negotiates a shared key group with each adjacent target quantum node and creates a corresponding group identification. At 420, a quantum relay node (e.g., a quantum key distribution device, and the like) may calculate the XOR gate value of all any two shared key groups among the nth shared key groups negotiated by it and nth adjacent target quantum nodes 360 and creates the corresponding identification. At 430, status information (e.g., a C (n, 2) virtual nodes responder routing status) is sent to one or more target recipients, where the quantum service node performs the shared key grouping negotiated with the adjacent target quantum node and the quantum key distribution device 350 may generate a global identification of the virtual node responder routing status used to create the key grouping information.

At 440, the target receiver may create network status identifiers for all the virtual node routing states of all quantum relay nodes with the same global identifier. At 450, the decision engine consistency verification system 300 may select a virtual quantum rule engine network state and/or virtual state slice for use when performing verification activities. At 460, the decision engine consistency verification system 300 may select a quantum key relay link between the real time & batch source node and may select the corresponding state of all virtual quantum nodes associated with the above quantum key relay link from virtual quantum network state or virtual network state slice. At 470, the decision engine consistency verification system 300 may filter out the virtual node routing data, calculate an exclusive or (XOR) value of all the virtual node routing data and create a virtual quantum link status identifier for the XOR quantum gate value. At 480, the decision engine consistency verification system 300 may encapsulate the virtual quantum link state between any two quantum service nodes in some or all quantum service nodes in the target quantum network into a database decision engine data file. At 490, The target quantum node negotiates a certain amount of shared quantum keys with adjacent target quantum nodes. At 495, The target quantum node and adjacent target quantum nodes may use the same dynamic on demand virtualization routing status method for nodes & data sets for real-time operations and/or batch process operations.

Figure 5:
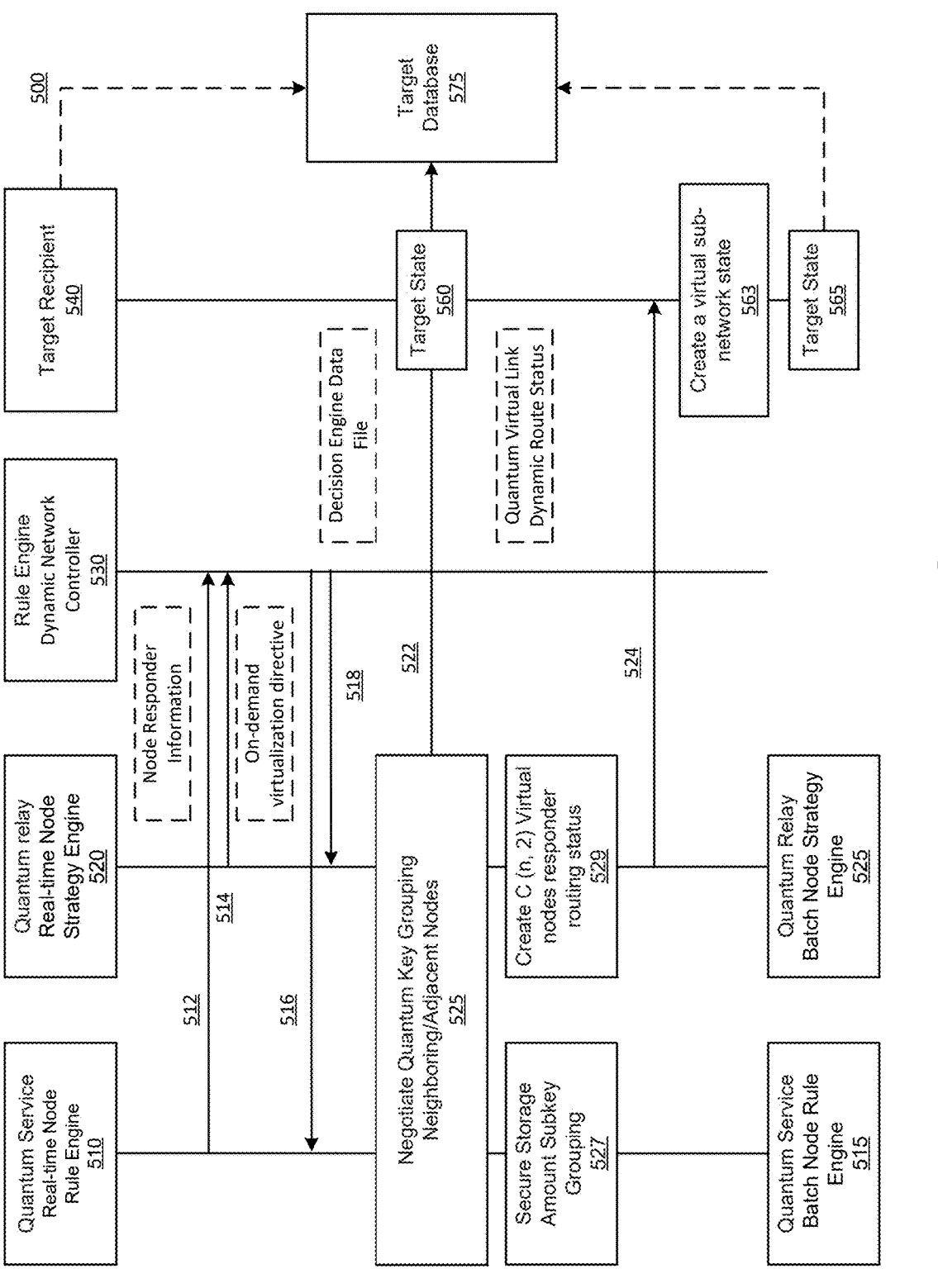
FIG. 5 shows an illustrative operation sequence for performing perform decisioning consistency validation in accordance with one or more aspects described herein.

FIG. 5 shows an illustrative operation sequence 500 for performing perform decisioning consistency validation in accordance with one or more aspects described herein. The decision engine consistency verification system may include a quantum service real-time node rule engine 510, a quantum service batch node rule engine 515, a quantum relay real-time node strategy engine 520, a quantum relay batch node strategy engine 525, a rule engine dynamic network controller 530, a target recipient 540, and a target repository, such as a target database 575. The decision engine consistency verification system provides a quantum service responder that performs strategies via a relay virtual network. In doing so, the decision engine consistency verification system improves inefficiencies with current processes to increase a turn-around time for feedback and provides faster validation by using virtual quantum link. The rule engine data network may utilize a dynamic routing status, which is more efficient and is less time consuming than present methods. For example, a need for dynamic data is solved by an on-demand virtualization of nodes and/or data sets.

At 512, the quantum service real-time node rule engine 510 and/or the quantum service batch node rule engine 515, individually or concurrently, may communicate node responder information to the rule engine dynamic network controller 530, such as to identify quantum nodes associated with the operations. At 514, the quantum relay real-time node strategy engine 520 may communicate to the rule engine dynamic network controller 530 strategies associated with the data repository subject to verification, At 516, the rule engine dynamic network controller 530 may provide an on-demand virtualization directive, based on analysis of the quantum node information for real-time and/or batch processing and/or the real-time node strategies and/or the batch node strategies, to one or both of the quantum service real-time node rule engine 510 and/or the quantum service batch node rule engine 515. Similarly, at 518, the rule engine dynamic network controller 530 may provide an on-demand virtualization directive, based on analysis of the quantum node information for real-time and/or batch processing and/or the real-time node strategies and/or the batch node strategies, to one or both of the quantum relay real-time node strategy engine 520 and the quantum relay batch node strategy engine 525. The quantum service real-time node rule engine 510, the quantum service batch node rule engine 515, the quantum relay real-time node strategy engine 520 and/or the quantum relay batch node strategy engine 525 may negotiate quantum key groupings for neighboring and/or adjacent nodes that may process data verification processes. At 522, the quantum service real-time node rule engine 510, the quantum service batch node rule engine 515, the quantum relay real-time node strategy engine 520 and/or the quantum relay batch node strategy engine 525 may communicate a target state 560 to the target recipient 570, where the target database may correspond to a target state of the target database 575.

At 529, the quantum relay real-time node strategy engine 520 and/or the quantum relay batch node strategy engine 525 may create a number of (e.g., C(n,2) virtual nodes to provide responder routing status at 529. After determining the quantum key groupings, the quantum service real-time node rule engine 510 and/or the quantum service batch node rule engine 515 may finalize quantum key groupings and may securely store an amount (e.g., a predetermined number) of subkey groupings at 527. In some cases, the status may be communicated to the target recipient 540 at 524, where the target recipient may create a virtual sub-network state 563 and a second target state 565 corresponding to the target database 575. In some cases, the target state 560 may relate to a verification target state for real-time processing data and the target state 565 may relate to a verification target state for batch processing data. In some cases, the target state 560 and the target state 565 may be the same or may be different. In determining the target state 560 and the virtual sub-network state 563 and the target state 565 concurrently, the decision engine consistency verification system improves on the efficiencies of current processes to reduce latencies and reduce computing power when verifying data sets for both in real-time and batch processes.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
   a plurality of quantum nodes of a quantum network;
   a computing platform comprising
     a processor; and
     memory storing instructions that, when executed by the processor, cause the computing platform to:
       negotiate, by a first quantum node of the plurality of quantum nodes, a shared key group with at least a second quantum node, wherein the first quantum node is adjacent to the second quantum node;
       calculate, by a quantum relay node, an exclusive or (XOR) value of a pair of quantum nodes comprising the first quantum node and the second quantum node;
       send, to one or more target recipients comprising one or more target nodes, an instruction for the first quantum node to perform a shared key grouping with the second quantum node;

select a quantum key relay link between the first quantum node comprising a real-time node associated with real-time processing operations and the second quantum node comprising a batch source node associated with batch processing operations;

select a corresponding state of the first quantum node and the second quantum node associated with the quantum key relay link from one or both of a virtual quantum network state or a virtual network state slice;

encapsulate a virtual quantum link state between the first quantum node and the second quantum node in the quantum network into a database decision engine data file identifying each virtual quantum link state between the first quantum node and the second quantum node;

initiate negotiation by a target quantum node a predetermined number of shared quantum keys with adjacent target quantum nodes comprising the first quantum node and the second quantum node; and cause utilization, by the first quantum node and the second quantum node of the quantum network, dynamic on-demand virtualization routing status method for nodes and data sets to provide a common target state for the first quantum node and the second quantum node.

2. The system of claim 1, wherein the first quantum node negotiates with a plurality of adjacent quantum nodes of the plurality of quantum nodes.

3. The system of claim 2, wherein the instructions further cause the computing platform to cause each quantum node of the plurality of quantum nodes of the quantum network to negotiate a shared key group with each adjacent quantum node.

4. The system of claim 1, wherein the instructions further cause the computing platform to:

calculate the XOR value of any two shared key group among all shared key groups of the plurality of quantum nodes; and create a corresponding identification for the any two shared key group.

5. The system of claim 1, wherein a target receiver creates network status identifiers for all virtual node routing states for all quantum relay nodes with the same global identifier.

6. The system of claim 1, wherein the instructions further cause the computing platform to select one of virtual quantum rule engine network state and a virtual state slice.

7. The system of claim 1, wherein the instructions further cause the computing platform to:

filter virtual node routing data;

calculate the XOR value of all virtual node routing data; and create a virtual quantum link status identifier for a XOR quantum gate value.

8. A computing platform comprising:

a processor; and memory storing instructions that, when executed by the processor, cause the computing platform to:

negotiate, by a first quantum node of a plurality of quantum nodes, a shared key group with at least a second quantum node, wherein the first quantum node is adjacent to the second quantum node;

calculate, by a quantum relay node, an exclusive or (XOR) value of a pair of quantum nodes comprising the first quantum node and the second quantum node;

send, to one or more target recipients comprising one or more target nodes, an instruction for the first quantum node to perform a shared key grouping with the second quantum node;

select a quantum key relay link between the first quantum node comprising a real-time node associated with real-time processing operations and the second quantum node comprising a batch source node associated with batch processing operations;

select a corresponding state of the first quantum node and the second quantum node associated with the quantum key relay link from one or both of a virtual quantum network state or a virtual network state slice;

encapsulate a virtual quantum link state between the first quantum node and the second quantum node in the quantum network into a database decision engine data file identifying each virtual quantum link state between the first quantum node and the second quantum node;

initiate negotiation by a target quantum node a predetermined number of shared quantum keys with adjacent target quantum nodes comprising the first quantum node and the second quantum node; and cause utilization, by the first quantum node and the second quantum node of the quantum network, dynamic on-demand virtualization routing status method for nodes and data sets to provide a common target state for the first quantum node and the second quantum node.

9. The computing platform of claim 8, wherein the first quantum node negotiates with a plurality of adjacent quantum nodes of the plurality of quantum nodes.

10. The computing platform of claim 8, wherein the instructions further cause the computing platform to cause each quantum node of the plurality of quantum nodes of the quantum network to negotiate a shared key group with each adjacent quantum node.

11. The computing platform of claim 8, wherein the instructions further cause the computing platform to:

calculate the XOR value of any two shared key group among all shared key groups of the plurality of quantum nodes; and create a corresponding identification for the any two shared key group.

12. The computing platform of claim 8, wherein a target receiver creates network status identifiers for all virtual node routing states for all quantum relay nodes with the same global identifier.

13. The computing platform of claim 8, wherein the instructions further cause the computing platform to select one of virtual quantum rule engine network state and a virtual state slice.

14. The computing platform of claim 8, wherein the instructions further cause the computing platform to:

filter virtual node routing data;

calculate the XOR value of all virtual node routing data; and create a virtual quantum link status identifier for a XOR quantum gate value.

15. Non-transitory computer readable media storing instructions that, when executed by a processor, cause a computing platform to:

negotiate, by a first quantum node of a plurality of quantum nodes, a shared key group with at least a second quantum node, wherein the first quantum node is adjacent to the second quantum node;

calculate, by a quantum relay node, an exclusive or (XOR) value of a pair of quantum nodes comprising the first quantum node and the second quantum node;

send, to one or more target recipients comprising one or more target nodes, an instruction for the first quantum node to perform a shared key grouping with the second quantum node;

select a quantum key relay link between the first quantum node comprising a real-time node associated with real-time processing operations and the second quantum node comprising a batch source node associated with batch processing operations;

select a corresponding state of the first quantum node and the second quantum node associated with the quantum key relay link from one or both of a virtual quantum network state or a virtual network state slice;

encapsulate a virtual quantum link state between the first quantum node and the second quantum node in the quantum network into a database decision engine data file identifying each virtual quantum link state between the first quantum node and the second quantum node;

initiate negotiation by a target quantum node a predetermined number of shared quantum keys with adjacent target quantum nodes comprising the first quantum node and the second quantum node; and cause utilization, by the first quantum node and the second quantum node of the quantum network, dynamic on-demand virtualization routing status method for nodes and data sets to provide a common target state for the quantum target node and the second quantum node.

16. The non-transitory computer-readably media of claim 15, wherein the first quantum node negotiates with a plurality of adjacent quantum nodes of the plurality of quantum nodes.

17. The non-transitory computer-readably media of claim 15, wherein the instructions further cause the computing platform to cause each quantum node of the plurality of quantum nodes of the quantum network to negotiate a shared key group with each adjacent quantum node.

18. The non-transitory computer-readably media of claim 15, wherein the instructions further cause the computing platform to:

calculate the XOR value of any two shared key group among all shared key groups of the plurality of quantum nodes; and create a corresponding identification for the any two shared key group.

19. The non-transitory computer-readably media of claim 15, wherein a target receiver creates network status identifiers for all virtual node routing states for all quantum relay nodes with the same global identifier.

20. The non-transitory computer-readably media of claim 15, wherein the instructions further cause the computing platform to:

filter virtual node routing data;

calculate the XOR value of all virtual node routing data; and create a virtual quantum link status identifier for a XOR quantum gate value.

* * * * *